Oct. 16, 1945.    B. G. CARLSON    2,386,884
TOW GLIDER POSITION INDICATOR
Filed Jan. 26, 1944    5 Sheets-Sheet 1

INVENTOR.
BERT G CARLSON
BY
Frank H Harmon
ATTORNEY

Oct. 16, 1945.  B. G. CARLSON  2,386,884
TOW GLIDER POSITION INDICATOR
Filed Jan. 26, 1944  5 Sheets-Sheet 2

INVENTOR.
BERT G. CARLSON
BY
Frank N. Harmon
ATTORNEY

Oct. 16, 1945.   B. G. CARLSON   2,386,884
TOW GLIDER POSITION INDICATOR
Filed Jan. 26, 1944   5 Sheets-Sheet 3

INVENTOR.
BERT G. CARLSON
BY
Frank H. Harmon
ATTORNEY

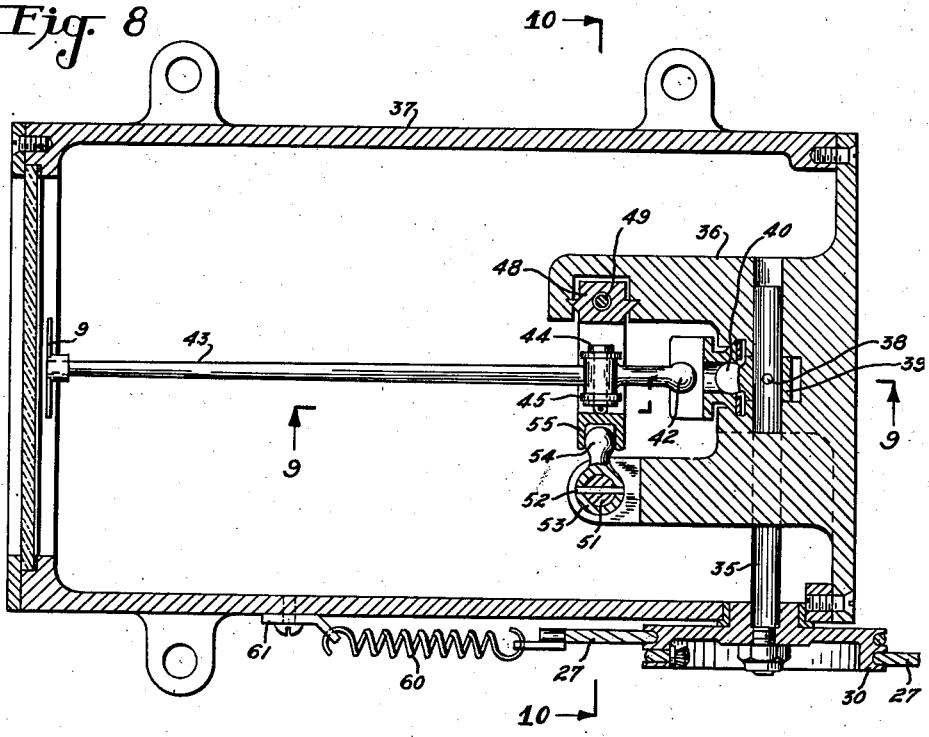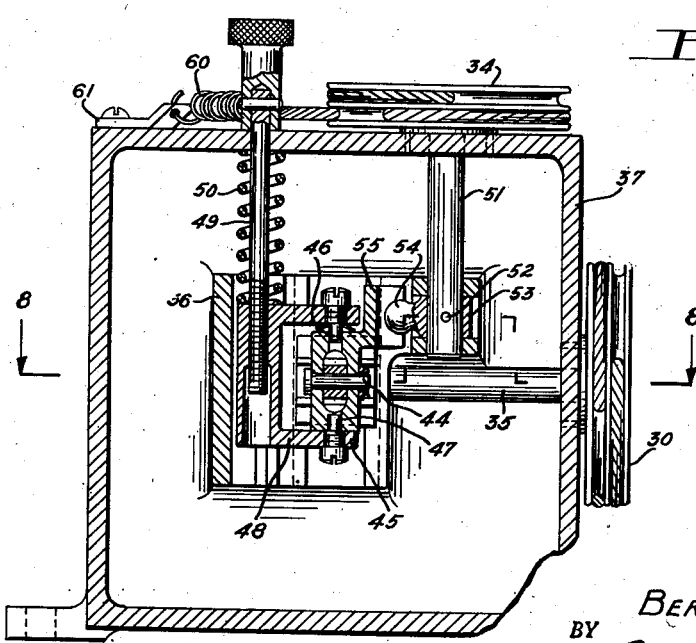

Oct. 16, 1945. B. G. CARLSON 2,386,884
TOW GLIDER POSITION INDICATOR
Filed Jan. 26, 1944 5 Sheets-Sheet 5

INVENTOR.
BERT G. CARLSON
BY
Frank H. Harmon
ATTORNEY

Patented Oct. 16, 1945

2,386,884

UNITED STATES PATENT OFFICE 2,386,884

TOW GLIDER POSITION INDICATOR

Bert G. Carlson, Gates Mills, Ohio, assignor, by mesne assignments, to Jack & Heintz, Inc., Cleveland, Ohio, a corporation of Ohio Application January 26, 1944, Serial No. 519,821

11 Claims. (Cl. 33—1)

This invention relates to indicating devices and has for its object to provide a dashboard instrument for a towed motorless aircraft for indicating its true attitude in space relative to that of the power driven towing aircraft.

It is a well known fact in aeronautics that a power driven airplane propeller creates such turbulent air in its wake, known as propeller wash, as to make it unsafe and virtually impossible to properly control either a towed or power driven airplane in this area, or cone, of propeller wash directly behind the airplane whose propeller is creating the turbulent air.

Now that it has become established practice to use motorless towed aircraft to increase the load carrying capacity per horse power of the motor of the towing aircraft and to even provide the towed aircraft with automatic controlling devices, it becomes extremely important to provide the pilot of the towed aircraft with suitable instruments to enable him to at all times determine his exact relationship with the towing aircraft. This is especially true when flying during atmospheric conditions lending poor visibility and in cloud banks where towed aircraft pilots cannot even see the towing aircraft. Being dependent upon the pull of the tow rope of the towing aircraft, and in the absence of any manipulation of the control surfaces of the towed aircraft, the natural result would be for the towed aircraft to fall in line with the towing aircraft and thus fall into the cone of turbulent propeller wash and thus be uncontrollable.

It has also become the accepted practice to tow two or more aircraft simultaneously in which case they are not towed in tandem but each towed aircraft has its own tow rope connected to the towing aircraft. In such a case it becomes increasingly important to the pilot of each towed aircraft to know his relationship to the towing aircraft and the other towed aircraft to avoid the propeller wash and avoid collision between the towed aircraft.

Thus in the case of the single towed aircraft it should maintain an attitude either above or below and directly behind the towing aircraft and the proposed dashboard instrument is designed to indicate to the pilot of the towed aircraft when such a relative attitude of his craft has been accomplished to a predetermined degree by either manual or automatically effected control of his craft.

In the case of two or more towed aircraft each should be above or below and respectively to either side of the direct path of propeller wash behind the towing aircraft. The proposed instrument for each towed aircraft is calibrated to indicate to each towed pilot the predetermined degree of spaced relationship of his craft both above or below and to the right or left of the propeller wash directly behind the towing aircraft.

With the foregoing and other objects in view, the invention resides in the combination of parts and in the details of construction hereinafter set forth in the following specification and appended claims, certain embodiments thereof being illustrated in the accompanying drawings, in which:

Figure 8 is a top view in longitudinal section taken through the indicating instrument;

Figure 10 is a view in section taken along line 10—10 of Figure 8;

Figure 1:
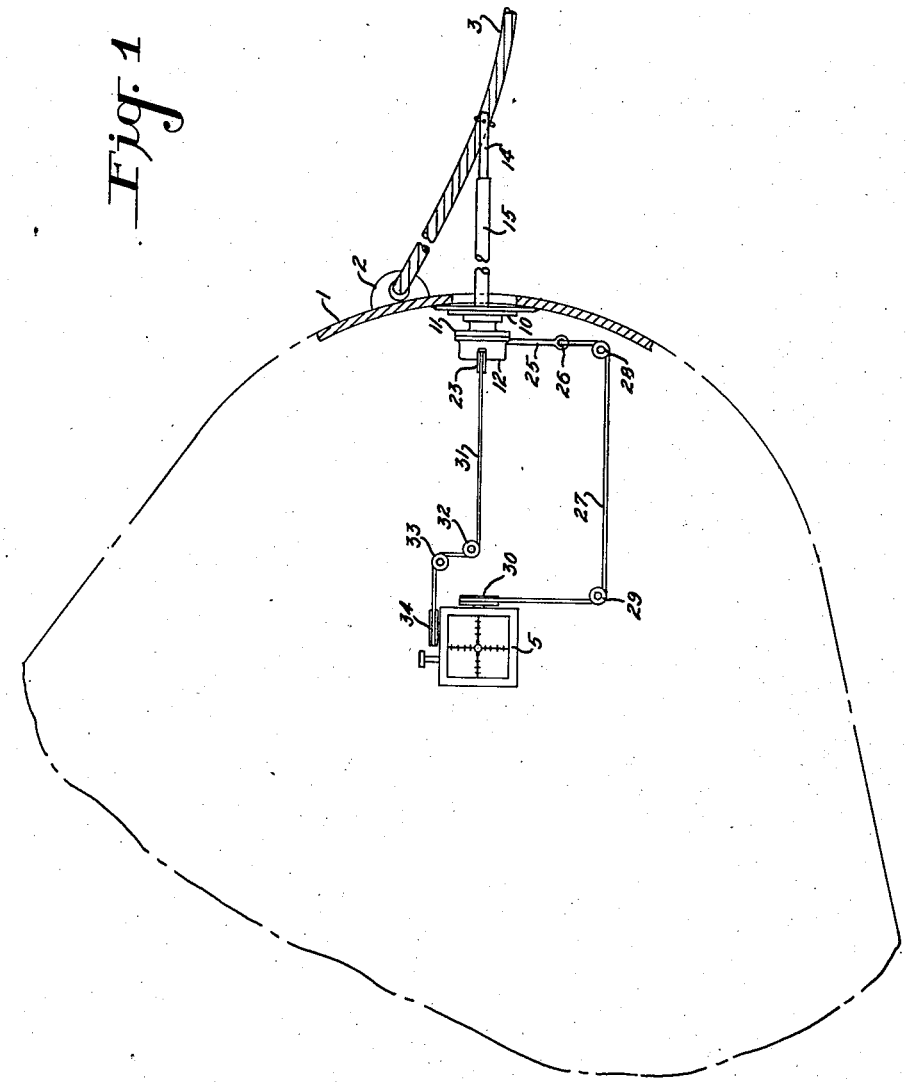
Figure 1 is a schematic illustration of the nose of a towed aircraft, showing the towing rope, the lever of the control unit connected thereto, the control unit and the operating connections between the same and the instrument itself for indicating the relative position of the towed aircraft.
Figure 2:
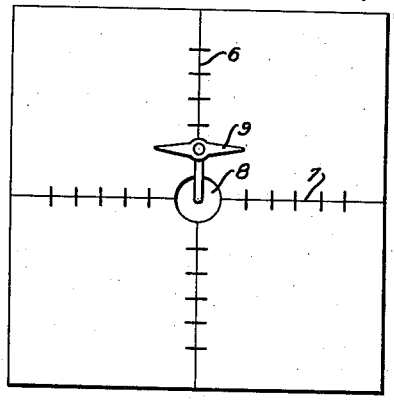
Figure 2 illustrates an indication of the proper relative attitude of a single towed aircraft on its dashboard instrument, namely, directly behind but above a line directly behind the towing aircraft.
Figure 3:
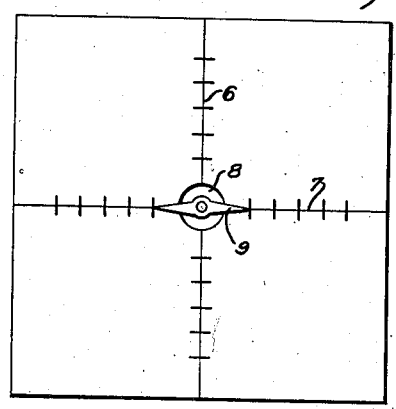
Figure 3 shows an improper attitude directly behind the towed aircraft so as to be in the propeller wash.
Figure 4:
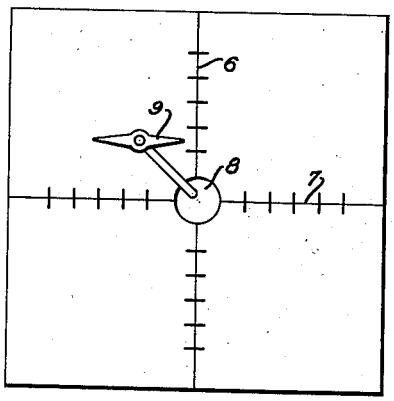
Figure 4 shows a proper attitude of one of two towed aircraft, namely, to the left and above the towing aircraft.
Figure 5:
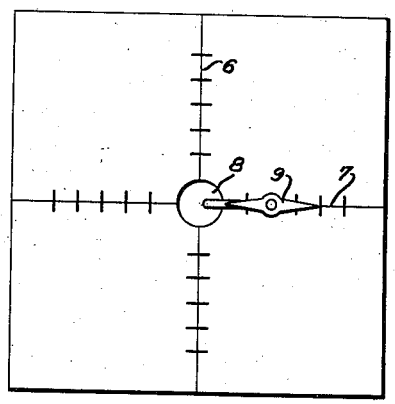
Figure 5 shows an improper attitude, to the right but not above or below the towing aircraft.
Figure 6:
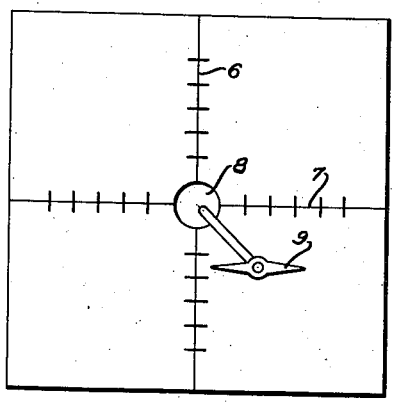
Figure 6 shows a proper attitude, to the right and below the towing aircraft.
Figure 7:
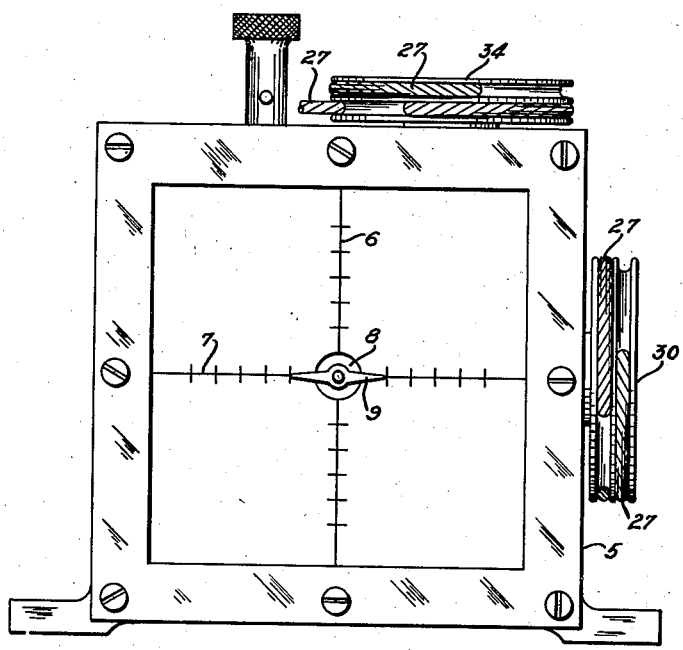
Figure 7 is a view in front elevation of the face of the instrument, showing the operating pulleys for connection to cables of the control unit.
Figure 9:
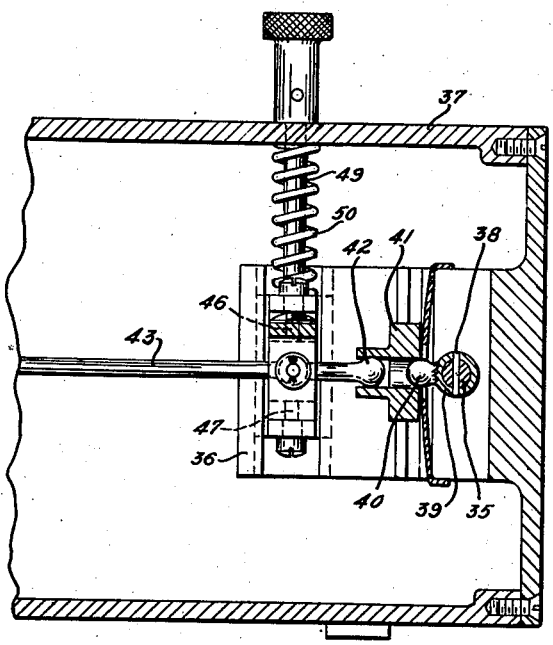
Figure 9 is a view in section taken along line 9—9 of Figure 8.

Referring more particularly to the drawings, the nose of the towed aircraft is generally indicated at 1 which has an eye bracket 2 to receive one end of a tow rope 3, the other end of the tow rope being attached to the towing aircraft.

As stated before, the object of the invention is to provide an instrument for the towed aircraft to indicate its attitude and position with respect to the towing aircraft. The face of the instrument is shown at 4 in a frame 5 and having a graduated vertical line 6 and a graduated horizontal line 7 intersecting the central circle 8 of the face over a portion of which face a miniature airplane 9 is moved by control elements yet to be described.

These control elements generally include a universally mounted arm to be moved by the tow rope, separate and independently operated arms moved by the actuating arm and independently operating actuating means connected through cables and pulleys in response to the movements of such arms so as to move the miniature airplane angularly in any direction over the face of the instrument.

Figure 11:
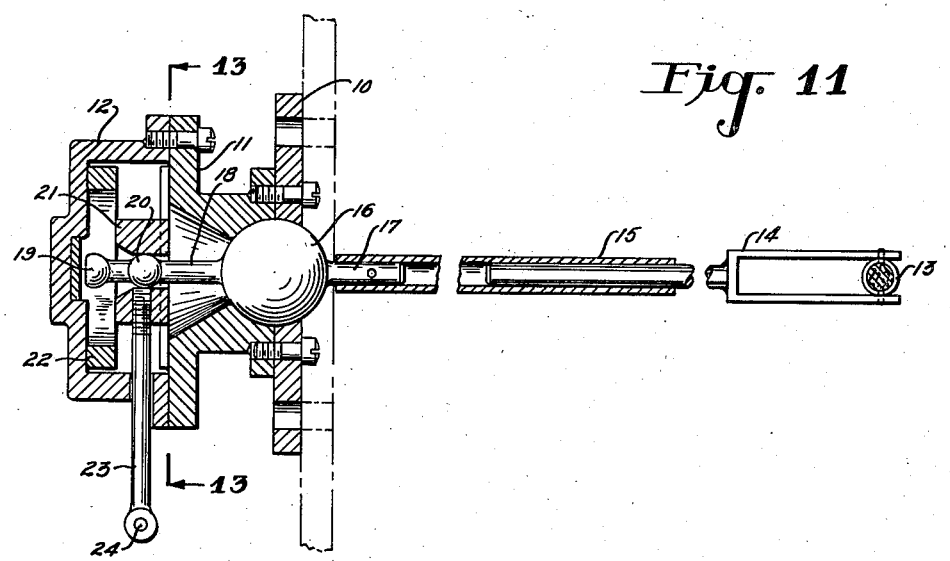
Figure 11 is a view in longitudinal section taken through the control unit and its operating arms.
Figure 12:
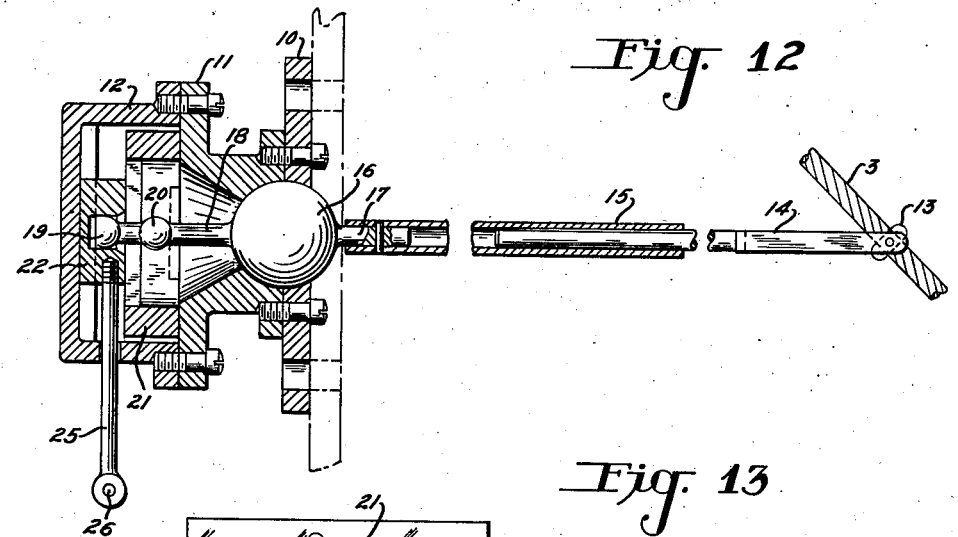
Figure 12 is a sectional view similar to Figure 11 taken at right angles thereto.
Figure 13:
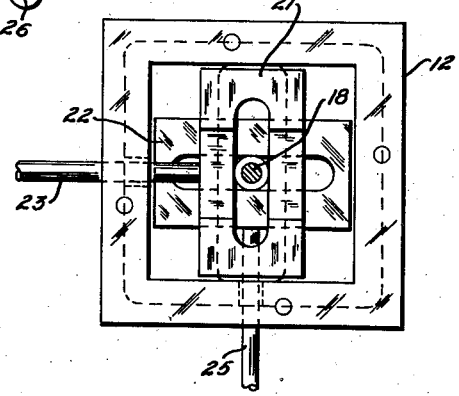
Figure 13 is a plan view of the control unit with the cover removed and taken along line 13—13 of Figure 11.

By reference to Figures 1, 11 and 12 it will be seen that there is provided a plate 10 carried by the nose of the towed airplane to which plate is secured a control unit having a housing comprising two separately connected castings 11 and 12.

The tow cable passes through a loop 13 that is held in swivel relationship in a fork 14 that fits within a sleeve 15. This sleeve is provided with a universal joint connection to the towed aircraft, which universal connection consists of a ball 16 releasably mounted in a semi-spherical recess in the plate 10 and the casting 11. This ball is provided with an extension 17 that is secured interiorly in the sleeve 15. The ball 16 also has an extension 18 that has two integral spaced balls 19 and 20. Within the casting 12 are arranged two sliding blocks 21 and 22.

Referring to Figure 11 which is a top view of the assembly, the block 21 is mounted for sliding in a vertical direction which in reality would be in a horizontal direction from side to side in actual installation. As viewed in Figure 12, the block 22 is mounted for sliding in a vertical direction, and Figure 12 being a side view, block 22 is actually mounted for vertical movement in the actual construction. Ball 20 is mounted for snug engagement in the central bore of block 21, and ball 19 is similarly mounted in block 22. Block 21 is also provided with a screw threaded bolt 23 that extends through the casting 12 and has a loop 24 to receive a cable connection. Block 22 is also provided with a similar screw bolt 25 that extends through casting 12 and is provided with a loop 26 for a suitable cable connection.

Should the flight attitude of the towed aircraft be controlled to deviate from that of the towing aircraft so that the longitudinal axis of the former is above that of the latter, the net result is the imparting by the tow rope 3 of a downward pull which pulls sleeve 15 downwardly and in a clockwise direction as viewed in Figure 1 while the ball 16 rotates in its socket. Referring to Figure 12, this clockwise movement through the ball 19 forces the block 22 upwardly and consequently raises the screw bolt 25. It follows that as the towed aircraft is controlled to assume such an attitude that its longitudinal axis is below that of the towing aircraft, the sleeve 15 is rotated in a counterclockwise direction and the bolt 25 is drawn downwardly as viewed in Figure 12.

If the towed aircraft is controlled to assume a flight attitude so that its longitudinal axis is to the left of that of the towing aircraft, the sleeve 15 will be rotated in a clockwise direction about its ball and socket joint 16, as viewed in Figure 11, causing the ball 20 in the block 21 to force the screw bolt 23 upwardly. It follows that if the towed aircraft is controlled so that its longitudinal axis is to the right of that of the towing airplane, the sleeve 15 will be rotated in a counterclockwise direction about its ball and socket joint causing ball 20 to move the block 21 and consequently the screw bolt 23 downwardly, as viewed in Figure 11.

To the loop 26 of bolt 25 is connected a cable 27 that passes over suitable pulleys 28 and 29 and around an operating drum 30, which cable, through means yet to be described, causes the miniature airplane 9 to be moved vertically with respect to the center 8 in accordance with the vertical movements of the bolt 25 in either direction. To the loop 24 of the operating bolt 23 is connected a cable 31 which passes over suitable pulleys 32 and 33 and around an operating drum 34 which, through means yet to be described, causes a lateral movement from side to side of the miniature airplane 8 over the face 4 of the indicating instrument.

Operating drum 30 is carried by a shaft 35 that is keyed at 38 to a hollow sleeve 39 carrying a ball projection 40 that fits within a center bore of a block 41 that is mounted for sliding movement vertically in the casting 36. A rotation of operating drum 30 in either direction will cause a vertical movement of the block 41. Also fitting within the central bore of block 41 is a ball shaped end 42 of a lever 43 which is pivoted for vertical movement about a cross pin 44 that extends through a block 45, which block is mounted for rotation about a vertical axis, as viewed in Figure 10, when connected through the two screw bolts 46 and 47 to the stationary casting 36 through a casting 48 slidably guided within the stationary casting 36 under the urging of the spring adjustment pin 49, resiliently urged downwardly by the spring 50. Accordingly, a rotation of drum 30 and its shaft 35 in either direction causes the miniature airplane 9 carried by lever 43 to be moved upwardly and downwardly over the face of the instrument.

A rotation of the drum 34 in either direction causes a rotation of its shaft 51 which is pinned at 52 to a sleeve 53 with a ball projection 54 that fits within a block 55 so that a rotation of drum 34 in either direction causes the lever 43 to move the miniature airplane 9 from side to side or from left to right over the face of the instrument. The freedom of the block 45 to rotate about its own pivot, defined by pins 46 and 47, leaves the operating lever 43 to be operated from side to side in accordance with the movements of shaft 51 and the block 55 from side to side without interference. Likewise the block 55 is provided with two sides only permitting the ball 54 which is keyed to the operating shaft 51 of the operating drum 34 relative movement with respect to the block 55 in one plane so as to not interfere with the movement of lever 43 about its vertical pivot 44 under the influence of shaft 35 and its operating drum 30.

Means are provided for keeping the cables taut in order to cause the drums 30 and 34 to follow the movements of the blocks 21 and 22 in opposite directions. In the present embodiment, these means comprise springs attached to the cable ends to keep the cables under tension at all times. In Figure 8 the cable 27 is shown as passing twice around the drum 30, and having its end attached to a spring 60 secured to a fitting 61 on the box 37. Similar tensioning means are provided on the top of the box for the end of the cable 31, the latter making two turns around the drum 34 in the same manner as cable 27 on the drum 30.

In lieu of this tensioning means, torsional springs may be applied to the drums, or their shafts, in which case the cable ends may be anchored in the drums.

Thus it will be seen that there has been provided a control unit including its operating arm 15 responsive to relative movement between the towing airplane and the towed airplane in both a vertical and a lateral plane and any components thereof. The universal ball and socket joint 16 permits non-interfering motion and actuation of the two control unit operating arms 23 and 25 for lateral and vertical movement of these arms. The independent or joint motion of these operating arms 23 and 25 is imparted through the dual cable system to the operating drums 30 and 34 for the vertical and lateral movements respectively of the lever 43 for carrying the miniature airplane.

It will also be seen that in the indicating instrument unit itself there has been provided universal joint assembly whereby the rotation of the two operating drums 30 and 34 either separately or together, may bring about a movement of the miniature airplane either vertically or horizontally, or a combination of the two movements, without any binding or interference between the means for moving the miniature airplane operating lever 43 in a vertical plane or a horizontal plane.

I claim:

1. An indicating instrument for indicating in a towed aircraft the longitudinal axis of its flight attitude with respect to that of the towing aircraft including an operating member mounted for universal movement on said towed aircraft and connected to the towing rope connecting said two aircraft so that said member is moved in response to relative movement of said two aircraft from a path of tandem flight with their projected longitudinal axes coincidental, an instrument dial and an indicator and an actuating lever therefor, and universally mounted operating means actuated by and in response to movements of said operating member and connected to said indicator to move the latter in vertical and horizontal planes and components thereof, said operating means comprising a control unit, a pair of blocks, one slidable horizontally and one vertically and both independently connected to said universal operating member to be independently operated thereby in accordance with its movements away from neutral position, and control elements attached to said blocks.

2. An indicating instrument for indicating in a towed aircraft the longitudinal axis of its flight attitude with respect to that of the towing aircraft including an operating member mounted for universal movement on said towed aircraft and connected to the towing rope connecting said two aircraft so that said member is moved in response to relative movement of said two aircraft from a path of tandem flight with their projected longitudinal axes coincidental, an instrument dial and an indicator and an actuating lever therefor, and universally mounted operating means actuated by and in response to movements of said operating member and connected to said indicator to move the latter in vertical and horizontal planes and components thereof, said operating means comprising a control unit, a pair of blocks, one slidable horizontally and one vertically and both independently connected to said universal operating member to be independently operated thereby in accordance with its movements away from neutral position, control elements attached to said blocks, and universally mounted means connected to said control elements and to said indicator to independently translate the sliding movements of said blocks to said indicator in vertical and horizontal planes and components thereof.

3. A device for indicating the relative position of a towed aircraft behind a towing aircraft, comprising a universally mounted operating arm, guiding means for said arm operable by the towing line, a horizontally slidable block responsive to horizontal movements of said arm, a vertically slidable block responsive to vertical movements of said arm, and a universally mounted indicating arm movable horizontally and vertically in response to the movements of said blocks for indicating said relative position.

4. A device for indicating the relative position of a towed aircraft behind a towing aircraft, comprising a universally mounted operating arm, guiding means for said arm operable by the towing line, a horizontally slidable block responsive to horizontal movements of said arm, a vertically slidable block responsive to vertical movements of said arm, a universally mounted indicating arm operable by horizontally and vertically slidable blocks, and cables connecting the horizontal and vertical blocks associated with said operating arm and indicating arm respectively for indicating said relative position.

5. In a device for indicating the relative position of a towed aircraft behind a towing aircraft, a universally mounted operating arm, guiding means on an extremity of said arm adapted to receive and be guided by a towing line, a horizontally movable block responsive to horizontal movements of said guiding means, and a vertically movable block responsive to vertical movements of said guiding means.

6. In a device for indicating the relative position of a towed aircraft behind a towing aircraft, a ball mounted operating arm, means on one extremity of said arm for receiving a towing line, horizontally and vertically slidable blocks associated with and movable by the opposite extremity of said arm, and means for attaching control cables to said blocks.

7. In a device for indicating the relative position of a towed aircraft behind a towing aircraft, an indicator comprising a universally mounted indicating arm, a vertically slidable block for producing vertical movements of said arm, a horizontally slidable block for producing horizontal movements of said arm, and means for actuating each of said blocks by an independent cable.

8. An indicator comprising a universally mounted indicating arm, a vertically slidable block for producing vertical movements of said arm, a rotatable shaft for vertically sliding said block, an horizontally slidable block for producing horizontal movements of said arm, drums on said shafts, and cables passing around said drums for producing said respective movements.

9. An indicator comprising a universally mounted indicating arm, a vertically slidable block for producing vertical movements of said arm, a rotatable shaft for vertically sliding said block, an horizontally slidable block for producing horizontal movements of said arm, a rotatable shaft for horizontally sliding said last-mentioned block, a drum on each of said shafts, and an individual cable passing around each of said drums and anchored in spring tensioning means, the other ends of said cables being actuated by independent movable means, for actuating said indicating arm.

10. An indicating instrument for indicating in a towed aircraft the longitudinal axis of its flight attitude with respect to that of the towing aircraft including an operating member mounted for universal movement on said towed aircraft and connected to the towing rope connecting said two aircraft so that said member is moved in response to relative movement of said two aircraft from a path of tandem flight with their projected longitudinal axes coincidental, an instrument dial and an indicator and an actuating lever therefor, and universally mounted operating means actuated by and in response to movements of said operating member and connected to said indicator to move the latter in vertical and horizontal planes and components thereof, said operating means comprising a control unit, a pair of actuating members, one movable horizontally and one vertically and both independently connected to said universal operating member to be independently operated thereby in accordance with its movements away from neutral position, and control elements attached to said actuating members.

11. A device for indicating the relative position of a towed aircraft behind a towing aircraft, comprising a universally mounted operating arm, guiding means for said arm operable by the towing line, a horizontally movable actuating member responsive to horizontal movements of said arm, a vertically movable actuating member responsive to vertical movements of said arm, and a universally mounted indicating arm movable horizontally and vertically in response to the movements of said actuating members for indicating said relative position.

BERT G. CARLSON.